United States Patent
Mauro (10) Patent No.: US 7,474,749 B2
(45) Date of Patent: *Jan. 6, 2009

(54) METHOD AND APPARATUS FOR ACHIEVING CRYPTO-SYNCRONIZATION IN A PACKET DATA COMMUNICATION SYSTEM

(75) Inventor: Anthony P. Mauro, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/349,420

(22) Filed: Feb. 6, 2006

(65) Prior Publication Data

US 2006/0126844 A1    Jun. 15, 2006

Related U.S. Application Data

(63) Continuation of application No. 09/489,194, filed on Jan. 20, 2000, now Pat. No. 7,003,114.

(51) Int. Cl.
*H04K 1/00* (2006.01)
*H04L 9/00* (2006.01)
(52) U.S. Cl. ........................ 380/255; 380/261
(58) Field of Classification Search ................ 380/200, 380/218, 270, 260–261, 255; 713/150, 160, 713/166, 189, 190; 709/230, 235–236, 238; 375/240, 240.01, 240.03
See application file for complete search history.

(56) References Cited

U.S. PATENT DOCUMENTS

| 4,817,146 A | 3/1989 | Szezutkowski |
| 6,298,055 B1 * | 10/2001 | Wildfeuer .................. 370/352 |
| 6,665,872 B1 | 12/2003 | Krishnamurthy |
| 7,003,114 B1 * | 2/2006 | Mauro ........................ 380/261 |

FOREIGN PATENT DOCUMENTS

WO        9914979        3/1999

OTHER PUBLICATIONS

Stevens, Richard W. 1994, TCP/IP Illustrated vol. 1, The Protocols. Addison-Wesley. vol. 1. pp. 285-286 and 310-311.

* cited by examiner

*Primary Examiner*—Hosuk Song
(74) *Attorney, Agent, or Firm*—Won Tae C. Kim; Thomas R. Rouse (57) ABSTRACT

A method and apparatus for achieving crypto-syncronization in a packet data communication system employing cryptographic communications. In a transmitter, a state vector is incremented at a predetermined rate and is provided to an encryption module. The encryption module uses the state vector to sequentially encrypt the data frames. During periods of frame dropping prior to encryption, the state vector is disabled, thereby allowing for sequential encryption of the data frames. In a receiver, during a frame dropping condition, the state vector is advanced in proportion to the number of frames dropped. During an underflow condition at the receiver, the state vector is disabled for the duration of the underflow condition, and enabled once the underflow condition has passed.

27 Claims, 7 Drawing Sheets

FIG. 1

| VOCODER FRAME | 1 | 2 | 3 | 4 | 5 | 6 |
|---|---|---|---|---|---|---|
| STATE VECTOR | 1 | 2 | 3 | 4 | 5 | 6 |

FIG. 2A

| VOCODER FRAME | 1 | 2 | ✗ | 4 | 5 | 6 |
|---|---|---|---|---|---|---|
| STATE VECTOR | 1 | 2 | 3 | 4 | 5 | 6 |

FIG. 2B

| VOCODER FRAME | 1 | 2 | ✗ | ✗ | ✗ | 6 |
|---|---|---|---|---|---|---|
| STATE VECTOR | 1 | 2 | 2 | 2 | 2 | 3 |

| | $T_1$ | $T_2$ | $T_3$ | $T_4$ | $T_5$ | $T_6$ |
|---|---|---|---|---|---|---|
| FRAME AVAILABLE IN QUEUE 312 ? | YES | YES | NO | NO | YES | NO |
| STATE VECTOR | 205 | 206 | 206 | 206 | 207 | 207 |

| $T_1$ | $T_2$ | $T_3$ | $T_4$ | $T_5$ |
|---|---|---|---|---|
| FRAME 1 | FRAME 2 | FRAME 5 | FRAME 6 | FRAME 8 |
| 205 | 206 | 209 | 210 | 212 |

METHOD AND APPARATUS FOR ACHIEVING CRYPTO-SYNCRONIZATION IN A PACKET DATA COMMUNICATION SYSTEM

CLAIM OF PRIORITY UNDER 35 U.S.C. §120

The present Application for Patent is a continuation of U.S Pat. No. 7,003,114 entitled "METHOD AND APPARATUS FOR ACHIEVING CRYPTO-SYNCHRONIZATION IN A PACKET DATA COMMUNICATION SYSTEM" issued on Feb. 21, 2006, and assigned to the assignee hereof and hereby expressly incorporated by reference herein.

I. Field of the Invention

The present invention pertains generally to the field of packet data communications employing encryption technology for safeguarding information, and more specifically to providing a method and apparatus for achieving crypto-syncronization in such a communication system.

II. Background

The field of packet data communications has gained widespread acceptance with the popularity of the Internet. Initially, packet data communications were carried over wires, with various communication components connected by wires. More recently, applications requiring wireless transmission of packet data have appeared in the form of wireless telephones and other wireless communication devices, such as wireless modems. Recently, there has become a need for these wireless communication devices to employ techniques to ensure that certain transmissions are not intercepted by unintended parties. Such safeguarding techniques often employ encryption technology, and is useful in such applications as military, police, and other security applications.

One technique for using encryption technology in a wireless communication device is to digitize analog signals into discreet data packets, or frames, generate a random code for each frame, then apply the code to each frame to encrypt the information contained therein. The random codes generated by this technique can be derived by using well-known public key encryption techniques, which encrypts information using a public key, or code, and decrypting the information using a private key.

The encryption technique described above is particularly suitable for use in a data communication systems, due to the nature of many data transmission protocols, such as TCP or IP. In such systems, data is transmitted as discreet segments, or data frames, each data frame generally containing a predetermined number of information bits. Alternatively, other data frames are defined by a predetermined time duration, containing a variable number of information bits within each frame. Traditionally, such data communication systems have been used to transmit information which is not time-critical, such as email, data files, and Internet web site information.

Recently, data communication systems have been used to transmit time-critical information as well, including audio information, such as human speech, and video information. In such systems, time-critical information is converted into digital information, often into data frames as described above. The data frames may then be transmitted over a computer network, such as the Internet, using well-known data transmission protocols, such as TCP and IP.

One of the primary problems of transmitting time-critical information using data protocols is the delay associated in the transmission process. Many data protocols use a re-transmission process if data segments are not properly received. The re-transmission process introduces a delay, or latency, in subsequently transmitted data frames, which adversely affects the time-critical data. For example, delays of more than a few hundred milliseconds in speech can result in unacceptable voice quality.

One solution to reducing the problem of latency when transmitting time-critical information using a data communication system is to drop data frames, at either a transmitter or a receiver, when the latency exceeds a predetermined threshold. In a transmitter, frames are dropped by transmitting only a fraction of the total number of frames available for transmission. In a receiver, frames are dropped by ignoring a fraction of the total number of frames received.

While dropping data frames reduces the problem of latency, it introduces another problem to communication systems employing the cryptographic technique explained above. Namely, if a frame is dropped at a transmitter, decryption of subsequent frames at the receiver is not possible because the sequential numbering of each frame as a result of the encryption process is disrupted. The decryption process relies on a stream of consecutively numbered frames as they were generated by the encryption process at the transmitter. Therefore, when frames are dropped at the transmitter prior to encryption, the frames received by the decryption process are no longer synchronized to the encryption process, resulting in frames which are incorrectly decrypted.

SUMMARY OF THE INVENTION

The present invention is a method and apparatus for achieving crypto-syncronization in a packet data communication system between a transmitter and a receiver. In a transmitter, information is digitized into data frames, then provided to a vocoder which generates vocoder frames. The vocoder frames are stored in a memory, then provided to an encryption module for encrypting each vocoder frame prior to transmission. Vocoder frames are encrypted by combining each frame with a unique code, or codebook, generated by the encryption module. The codebook is generated using at least a state vector, which is generally a sequential count which is incremented at a predetermined rate, generally a multiple of the rate at which vocoder frames are generated.

When frames are dropped at the transmitter, often to decrease transmission latency, the state vector is disabled for a time proportional to the number of frames dropped. Therefore, when a frame is dropped, the state vector is not incremented. When the desired number of frames have been dropped, the state vector is enabled once again, and resumes incrementing at the predetermined rate.

The effect of suspending the state vector during periods of frame dropping allows for sequential encryption for each frame provided to the encryption module. This technique allows any number of frames to be dropped at the transmitter prior to encryption, while ensuring that the decryption process at the receiver is synchronized to the encryption process.

At the receiver, frames are received and stored in a queue. Frames are provided to a decryption module to generate decrypted vocoder frames. A state vector generator located within the receiver is incremented at the predetermined rate. As each frame is provided to the decryption module, it is decrypted using a codebook derived from the current state vector.

If the number of frames stored within the queue decreases to the point where there are no frames available for decryption, known as an underflow condition, an erasure frame is provided directly to a vocoder, and the state vector generator is disabled, preventing the state vector from incrementing. When frames become available for decryption in the queue at a later time, the state vector generator is enabled, thus allowing the state vector to increment, providing consecutive state vectors to the decryption module and maintaining crypto-synchonization with the encryption process.

If many frames are stored in the queue prior to decryption at a given time, a delay, or latency, may result. During telephonic communications, latency causes an annoying delay between the time when a user speaks into a transmitter and when the speech is heard by a recipient. To reduce the problem of latency, some of the frames stored in the queue are not processed by the decryption module, or by any other element in the receiver. This is known as frame dropping.

When frames are dropped from the queue, the state vector is adjusted so that crypto-synchronization of subsequent frames is maintained. To achieve this, the state vector is adjusted by the number of consecutive dropped frames plus 1.

DETAILED DESCRIPTION OF THE PREFERRED EMBODIMENTS

The embodiments described herein are described with respect to a wireless communication system operating in accordance with the use of CDMA signal processing techniques of the IS-95, IS-707, and IS-99 Interim Standards. While the present invention is especially suited for use within such a communications system, it should be understood that the present invention may be employed in various other types of communications systems that transmit information in discreet packets, otherwise known as data packets, data frames, or simply frames, including both wireless and wireline communication systems, and satellite-based communication systems. Additionally, throughout the description, various well-known systems are set forth in block form. This is done for the purpose of clarity.

Figure 1:
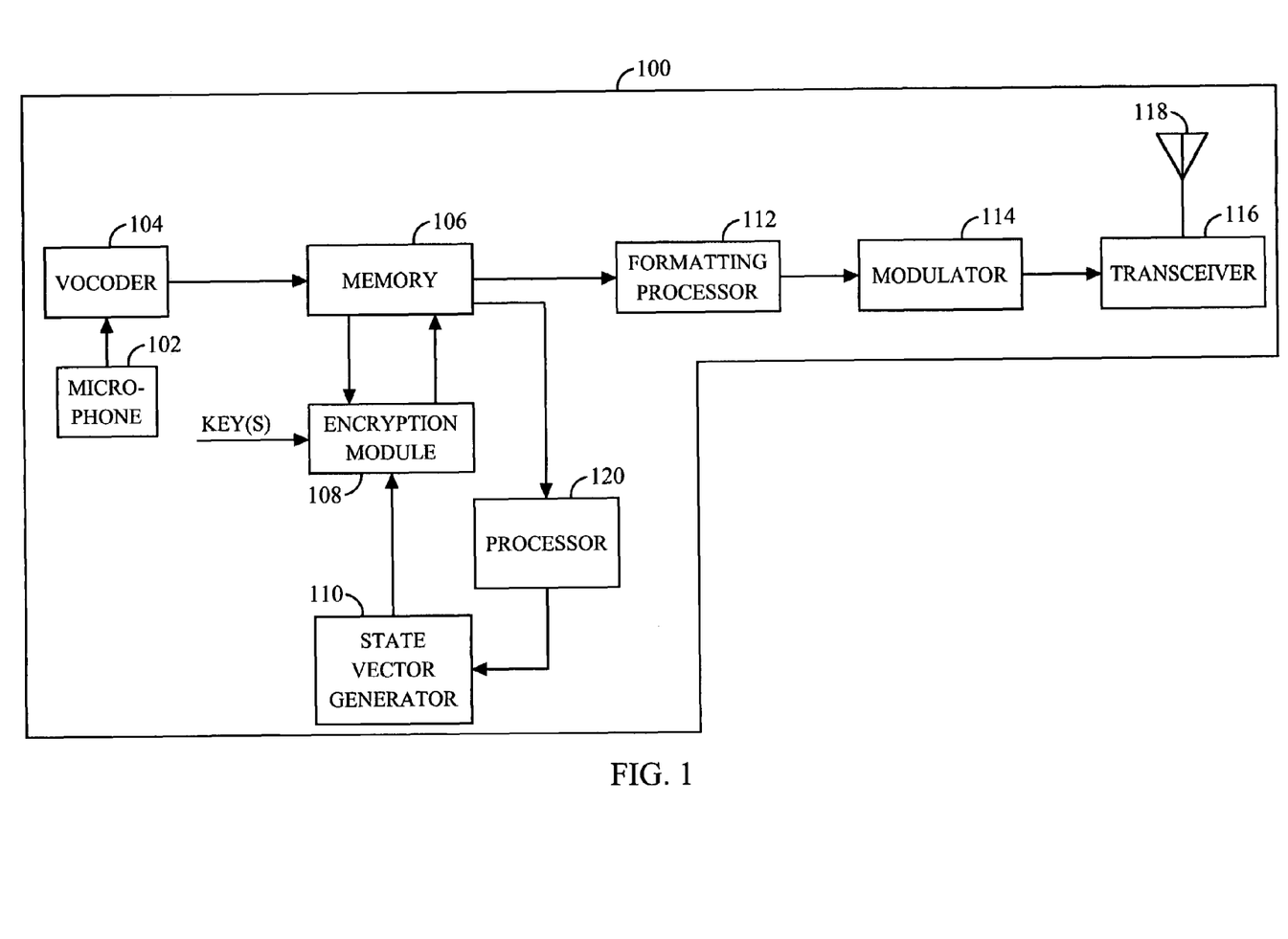
FIG. 1 illustrates a functional block diagram of a wireless transmitter employing cryptographic security techniques as used in the present invention.

A functional block diagram of a wireless transmitter 100 employing cryptographic security techniques is shown in FIG. 1. Audio information, such as voice, is converted from acoustic energy into electrical energy by transducer 102, typically a microphone. Transducer 102 could alternatively comprise a video device, for example a digital camera or a video recorder, for capturing light energy and converting the light energy into electrical signals. The electrical energy generated by transducer 102 is provided to a vocoder 104, which generally reduces the bandwidth necessary to transmit the audio information. Alternatively, a processing device suitable for the type of transducer is used in place of vocoder 104, such as a video processing device in the case of a camera used as transducer 102. Typically, vocoder 104 generates data frames at a constant, fixed rate, representing the original audio information. Alternatively, vocoder 104 generates data frames at a variable rate. Each data frame is generally fixed in length, measured in milliseconds. The data frames are provided to a memory 106 in the exemplary embodiment, where they are stored briefly prior to encryption and further processing by other functional elements of transmitter 100. In the exemplary embodiment, memory 106 stores only one vocoder frame at a time. In another embodiment, memory 106 is not used to store vocoder frames as they are produced by vocoder 104. Rather, frames are provided directly to encryption module 108.

Vocoder 104 may be further enhanced by offering variable data rates within the data frames that it produces. An example of such a variable rate vocoder is found in U.S. Pat. No. 5,414,796 (the '796 patent) entitled "VARIABLE RATE VOCODER", assigned to the assignee of the present invention and incorporated by reference herein. When little or no information is available for transmission, variable rate vocoders produce data frames at reduced data rates, thus increasing the transmission capacity of the wireless communication system. In the variable rate vocoder described by the '796 patent, data frames comprise data at either full, one half, one quarter, or one eighth the data rate of the highest data rate used in the communication system.

Encryption module 108 is responsible for encrypting each data frame with a unique code, or codebook. Generally, one codebook is generated for each data frame to be encrypted, generally at the same rate that frames are generated by vocoder 104. Therefore, one codebook is generally available for each data frame to be encrypted. Other techniques allow two data frames to encrypted with one codebook, the codebook having twice as many bits as one data frame.

The codebook is created using one of several well-known techniques. Among them are the Data Encryption Standard (DES), FEAL, and the International Data Encryption Algorithm (IDEA). In the exemplary embodiment of the present invention, DES is used to create codebooks, using a state vector along with one or more encryption keys, as shown in FIG. 1. The state vector is, in its simplest form, a counting sequence, incrementing at a predetermined rate, generally equal to a multiple of the rate at which data frames are generated by vocoder 104. The state vector is generated by state vector generator 110, using well known techniques, such as discrete electronic components, or a digital microprocessor in combination with a set of software instructions. Other techniques well known in the art are also contemplated.

Encryption module 108 produces one codebook every time state vector generator 110 is incremented. Each codebook produced is digitally combined with one data frame stored in memory 106, generally in the order that the data frames were stored in memory 106, to produce one encrypted data frame for every data frame provided to encryption module 108. Codebooks are combined with data frames using well-known techniques, such as adding one data frame to one codebook using modulo-2 arithmetic. In another embodiment, 2 data frames are added to a single codebook, the codebook in this embodiment having twice the number of bits as a single data frame.

In the present invention, not all vocoder frames generated by vocoder 104 are transmitted to a receiver. Some of the frames are eliminated, or "dropped," prior to being encrypted by encryption module 108. Frames are dropped to reduce the effect of latency, or delay, between a transmitter and a receiver. Latency can be a problem when transmitting real-time, or near real-time, information using data protocols, because the data protocols generally call for frame re-transmission to ensure a high percentage of frames received without errors. Frame re-transmissions cause a backup in the number of frames to be transmitted, which results in increased latency. By reducing the total number of frames to be transmitted, the latency is reduced or eliminated.

Referring back to FIG. 1, a processor 120 generally controls the frame dropping process, as well as a number of other processes within transmitter 100. Processor 120 comprises a digital processing device, such as any well-known microcomputer, DSP, or custom integrated ASIC. Frames may be dropped in any number of methods. For example, frames may be dropped at a single fixed rate, a dual fixed rate, at a variable rate, or a combination of any of these techniques.

When using a single, fixed rate of frame dropping, data frames are dropped by processor 120 at a predetermined, fixed rate. In the exemplary embodiment, the rate is 1 frame dropped per hundred frames generated by vocoder 104, or a rate of 1%. Processor 120 counts the number of frames generated by vocoder 104. When the $100^{th}$ frame is generated, processor 120 drops the frame by failing to store it in memory 106 if such a memory is used. If memory 106 is not used, the $100^{th}$ frame is simply not provided to encryption module 108. The next frame generated by vocoder 104, the $101^{st}$ frame, is then provided to memory 106 or directly to encryption module 108, as the case may be. Alternatively, other predetermined, fixed rates could be used, however, tests have shown that dropping more than 10 percent of frames leads to poor voice quality at a receiver.

In the case of a single, fixed rate frame dropping scheme, frames are dropped without regard to how much or how little communication channel latency exists between the transmitter and a receiver. However, in another embodiment, processor 120 monitors the communication channel latency and implements the fixed rate frame dropping technique only if the communication channel latency exceeds a predetermined threshold. The communication channel latency is generally determined by monitoring the communication channel quality. The communication channel quality is determined by methods well known in the art, and described below. If the communication channel latency drops below the predetermined threshold, processor 120 discontinues the frame dropping process.

Frame dropping can also be implemented using a dual, fixed rate approach. In this method, frames are dropped at either one of two fixed rates, depending on the communication channel latency. A first rate is used to drop frames when the communication channel latency is less than a predetermined threshold. A second fixed rate is used to drop frames when the communication channel latency exceeds the predetermined threshold. Again, the communication channel latency is generally derived from the communication channel quality, which in turn depends on the channel error rate.

Often, the communication channel quality, thus the communication channel latency, is expressed in terms of a channel error rate, or the number of frames received in error by the receiver divided by the total number of frames transmitted over a given time period. A typical predetermined threshold in the dual, fixed rate dropping method, then, could be equal to 7%, meaning that if more than 7 percent of the transmitted frames are received in error, generally due to a degraded channel condition, frames are dropped at the second rate. The second rate is generally greater than the first rate. If the channel quality is good, the error rate will generally be less than the predetermined rate, therefore frames are dropped using the first rate, typically equal to between one and four percent.

In practice, the first frame dropping rate could be equal to one percent, and the second frame dropping rate could be equal to eight percent. The predetermined threshold is set to a level which indicates a degraded channel quality, expressed in terms of the percentage of frames received in error by the receiver. In the present example, an error rate of 7 percent is chosen as the predetermined threshold. Processor 120 is capable of determining the channel quality in one of several methods well known in the art. For example, processor 120 can count the number of NAKs received by transmitter 100. A NAK is a common industry term meaning "negative acknowledgement". A NAK is sent by a receiver when it detects errors when receiving data from transmitter 100. When a NAK is received by transmitter 100, one or more previously transmitted frames are re-transmitted, the frames identified in the NAK. A higher number of NAKs indicates a poor channel quality, as more frame re-transmissions are necessary to overcome the poor channel condition. The power level of transmitted frames is another indication that processor 120 can use to determine the channel quality. Alternatively, processor 120 can simply determine the channel quality based on the number of frames stored in a transmission queue, such as memory 106. Under poor channel conditions, frame backup occurs in memory 106 due to a large number of frame re-transmissions, causing the number of frames stored in memory 106 to increase. When channel conditions are good, the number of frames stored in memory 106 is relatively low.

If the channel quality increases, frames are dropped at a first rate. If the channel quality decreases, frames are dropped at a second, higher rate.

The reason why frames are dropped at a higher rate when the channel quality is poor is that more frame re-transmissions occur during poor channel conditions, causing a backup of frames waiting to be transmitted at memory 106. At the receiver, during poor channel conditions, a receiver buffer first underflows due to the lack of error-free frames received, then overflows when the channel conditions improve. When the receive buffer underflows, erasure frames are provided to a voice decoder in order to minimize the disruption in voice quality to a user. If the receive buffer overflows, or becomes relatively large, latency is increased. Therefore, when the communication channel quality becomes degraded, it is desirable to drop frames at an increased rate at transmitter 100, so that neither memory 106 nor the receiver buffer grow too large, increasing latency to intolerable levels.

Another method of dropping frames at transmitter 100 is by dropping frames at a variable rate, depending on the communication channel latency. In this embodiment, processor 120 determines the quality of the communication channel using one of the techniques described above. The rate at which frames are dropped is inversely proportional to the communication channel quality. If the channel quality is determined by the channel error rate, the rate at which frames are dropped is directly proportional to the channel error rate.

A further method of dropping frames at transmitter 100 is by dropping frames in accordance with the rate at which the data frames were encoded by vocoder 104. In this embodiment, vocoder 104 comprises a variable-rate vocoder, as described above. Vocoder 104 encodes audio information into data frames at varying data rates, in the exemplary embodiment, four rates: full rate, half rate, quarter rate, and eighth rate. Processor 120 located within the transmitter determines the communication channel latency generally by determining the communication channel quality using one of the techniques discussed above. If processor 120 determines that the communication channel has become degraded beyond a predetermined threshold, a percentage of data frames having the lowest encoded rate generated by vocoder 104 are dropped. In the exemplary embodiment, a percentage eighth-rate frames are dropped if the communication channel becomes degraded by more than a predetermined threshold. If processor 120 determines that the communication channel has become further degraded beyond a second predetermined threshold, a percentage of data frames having the second lowest encoding rate generated by vocoder 104 are dropped in addition to the frames having the lowest encoding rate. In the exemplary embodiment, a percentage of both quarter-rate frames and eighth-rate frames are dropped if the communication channel becomes degraded by more than the second predetermined threshold as they are generated by vocoder 104. Similarly, a percentage of half rate and full rate frames are dropped if the communication channel degrades further. In a related embodiment, if the communication channel becomes degraded beyond the second predetermined threshold, only a percentage of data frames having an encoding rate of the second lowest encoding rate are dropped, while data frames having an encoding rate equal to the lowest encoding rate are not dropped.

The percentage of frames dropped in any of the above scenarios is generally a predetermined, fixed number, and may be either the same as, or different, for each frame encoding rate. For example, if lowest rate frames are dropped, the predetermined percentage may be 60%. If the second-lowest and lowest frames are both dropped, the predetermined percentage may be equal to 60%, or it may be equal to a smaller percentage, for example 30%.

After the encrypted data frames are generated by encryption module 108, they are stored in memory 106, or alternatively, in a second memory (not shown) until needed by further processing elements. For example, if data protocols are used to transmit the encrypted data frames, formatting processor 112 will use the encrypted data frames stored in memory 106 to construct data segments in accordance with the particular data protocol in use, such as the well-known TCP data protocol. Alternatively, or in addition, formatting processor 112 may use one or more other data protocols, such as the well-known RLP data protocol used primarily in CDMA communication systems.

The formatted frames are next provided to modulator 114. Modulator 114 modulates the formatted frames using the predetermined modulation technique of the wireless communication system. Examples of different modulation techniques include Time Division Multiple Access (TDMA), Code Division Multiple Access (CDMA), and Frequency Division Multiple Access (FDMA).

Once the data segments have been modulated, they are upconverted and transmitted by transceiver 116. The upconverted signal is provided to antenna 118 for wireless transmission to a receiver.

One problem using the encryption method in conjunction with the frame dropping method as described above is that the frame dropping process causes discontinuities in the encrypted frames generated by encryption module 108. Discontinuities result from the state vector generated by state vector generator 110 incrementing at a time at which no vocoder frame is available to be encrypted, due to the frame dropping process. This is best illustrated in FIGS. 2a, 2b, and 2c.

Figure 2A:
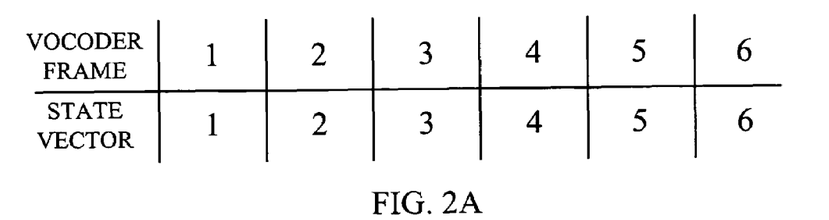
FIGS. 2a, 2b, and 2c illustrate the relationship between vocoder frames and a state vector as used in the transmitter of FIG. 1.

FIG. 2a illustrates a sequential series of vocoder frames numbered one through six and the value of the state vector generated by state vector generator 108 corresponding to each vocoder frame. In the exemplary embodiment, vocoder frames are generated at a constant rate of one frame every 20 milliseconds by vocoder 104. Each vocoder frame may be stored briefly in memory 106 prior to use by encryption module 108. In an alternative embodiment, vocoder frames are provided directly to encryption module 108. In either case, vocoder frames are provided to encryption module 108 at the same rate that vocoder 104 produces vocoder frames, in the exemplary embodiment, every 20 milliseconds. State vector generator 110 is incremented at the predetermined rate, generally a multiple of the rate at which vocoder frames are generated by vocoder 104.

In FIG. 2a, vocoder frame 1 is encoded by encryption module 108, using a codebook derived from state vector 1. Frame 2 is next encoded, using a codebook derived from state vector 2. Frame 3 is next encoded, using a codebook derived from state vector 3, and so on. In a receiver, the encrypted vocoder frames are decrypted using a state vector which is synchronized to frames being encrypted at transmitter 100. In other words, vocoder frame 1, which was encrypted using a codebook derived from state vector 1, is decrypted using a codebook derived from a state vector equal to 1. Vocoder frame 2 is decrypted using a codebook derived from a state vector equal to 2, and so on.

Figure 2B:
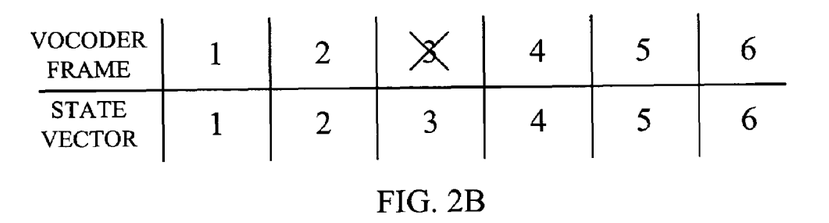
Figure 2C:
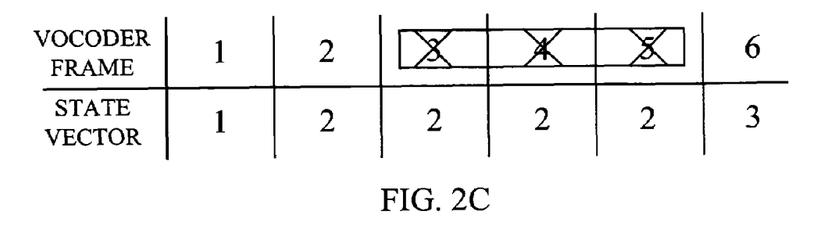

FIG. 2b illustrates a problem of the encryption process of FIG. 2a when a frame is dropped at transmitter 100. As before, vocoder frames 1 through 6 are shown in sequence as generated by vocoder 104. First, vocoder frame 1 is generated and encoded by encryption module 108 (with or without the use of memory 106) using a codebook derived from state vector 1. Next, vocoder frame 2 is generated by vocoder 104 and then encrypted using a codebook derived from state vector 2. Next, frame 3 is generated by vocoder 104, however, processor 120 determines that at least one frame should be dropped. Therefore, frame 3 is not provided to encryption module 108. Meanwhile, state vector generator 110 continues to increment, providing state vector 3 to encryption module 108. A codebook resulting from state vector 3 is generated, however it is not used, due to vocoder frame 3 being dropped. Next, vocoder frame 4 is generated and encrypted using a codebook derived from state vector 4.

At the receiver, vocoder frame 1 is received and decrypted using a codebook derived from state vector 1. Vocoder frame 2 is then decrypted using a codebook derived from state vector 2. The next frame received is vocoder frame 4, because vocoder frame 3 was dropped. Vocoder frame 4 is decrypted using a codebook derived from state vector 3, which results in unintelligible data, because vocoder frame 4 must be decrypted using a codebook derived from a state vector equal to 3.

Using the present invention, when a vocoder frame is dropped at transmitter 100, state vector generator 110 is disabled so that a state vector is not incremented during times where frames are dropped. This is illustrated in FIG. 2c. As shown in FIG. 2c, vocoder frames 1 through 6 are generated by vocoder 104. However, in this example, vocoder frames 3, 4, and 5 are dropped by processor 120. Vocoder frame 1 is encoded using a codebook derived from state vector 1. Vocoder frame 2 is encoded using a codebook derived from state vector 2. Vocoder frames 3, 4, and 5 are dropped by processor 120. Processor 120 sends a command to state vector generator 110, preventing the state vector from being incremented for the three frames that were dropped. When a sufficient number of frames has been dropped, processor 120 allows the next frame in sequence, in this example vocoder frame 6, to be encrypted by encryption module 110. A command is also sent by processor 120 to state vector generator 110 which increments the state vector to its next value, in this example, to a value of 3. Therefore, vocoder frame 6 is encrypted using a codebook derived from state vector 3.

At the receiver, vocoder frame 1 is received and decrypted using a codebook derived from a state vector equal to 1. Vocoder frame 2 is decrypted using a codebook derived from a state vector equal to 2. The next frame to be received is vocoder frame 6, since vocoder frames 3, 4, and 5 were dropped at transmitter 100. Vocoder frame 6 is decrypted using a codebook derived from a state vector equal to 3, which is the state vector used to encode this frame at transmitter 100. As one can see, this method preserves the crypto-synchronization between transmitter 100 and a receiver.

Figure 3:
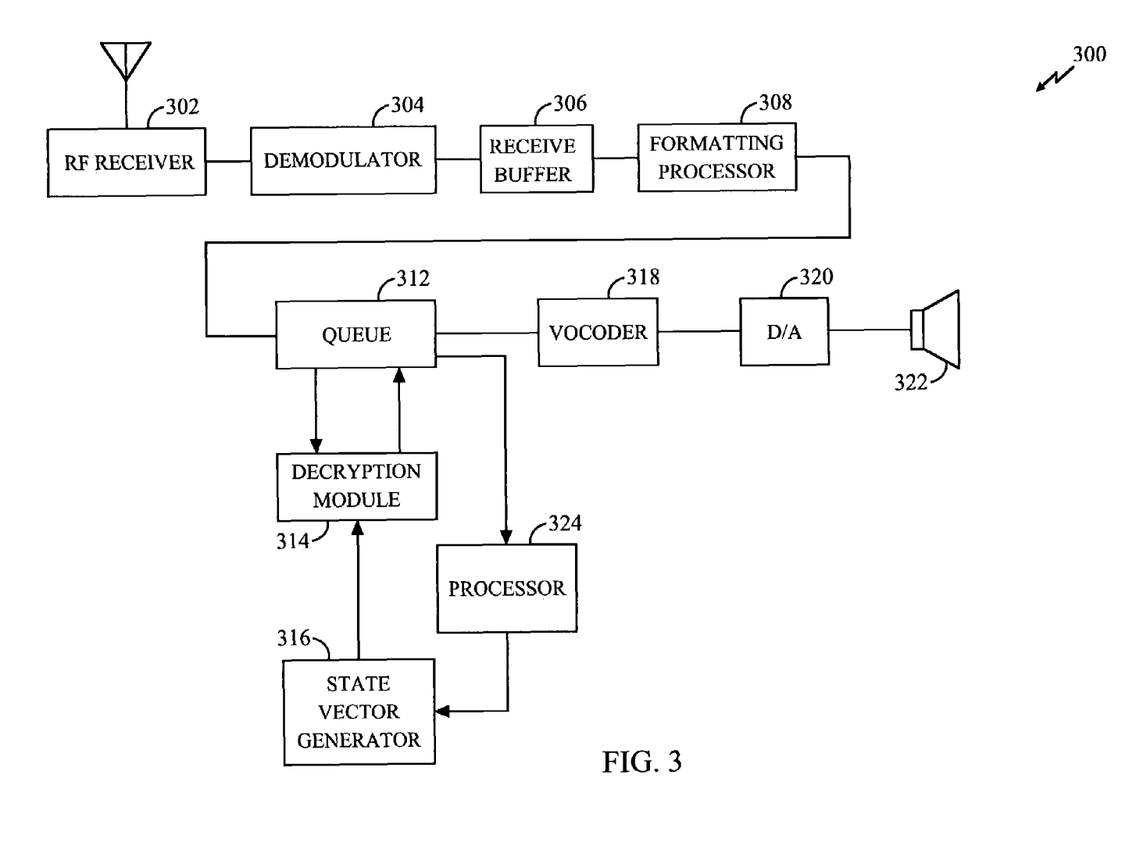
FIG. 3 illustrates a functional block diagram of a wireless receiver employing cryptographic security techniques as used in the present invention.

FIG. 3 is a functional block diagram of a receiver 300 used to receive the information transmitted by transmitter 100. In FIG. 3, the upconverted signal is received by RF receiver 302 using techniques well known in the art. The upconverted signal is downconverted then provided to demodulator 304, where the downconverted signal is converted into data frames. In the exemplary embodiment, the data frames comprise RLP frames, each frame 20 milliseconds in duration.

The RLP frames are then stored in receive buffer 306 for use by formatting processor 308. Formatting processor 308 uses the frames from buffer 306 to reconstruct the original data frames, in this example, vocoder frames. If multiple data protocols were used to transmit the information, for example TCP and RLP, formatting processor 308 accommodates both protocols to generate vocoder frames. The vocoder frames generated by formatting processor 308 are stored in queue 312, generally in a sequential manner. Queue 312 is generally capable of storing multiple vocoder frames prior to the frames being used by decryption module 314.

Decryption module 314 is responsible for decrypting each data frame stored in queue 312 with a unique codebook, similar to the technique used to encrypt data frames as discussed above. Generally, one codebook is generated for each data frame to be decrypted, generally at the same rate that frames are generated by vocoder 104 at transmitter 100. Therefore, one codebook is generally available for each data frame to be decrypted. Other techniques allow two vocoder frames to decrypted with one codebook, the codebook having twice as many bits as one vocoder frame.

The codebook is created using one of several well-known techniques, as explained above. In the exemplary embodiment of the present invention, a state vector is used to generate the codebook, along with one or more decryption keys, as shown in FIG. 3. The state vector in FIG. 3, like the state vector in transmitter 100, is a counting sequence, incrementing at the same predetermined rate as the state vector at transmitter 100. The state vector is generated by state vector generator 316, using well known techniques, such as discrete electronic components, or a digital microprocessor in combination with a set of software instructions. Other techniques well known in the art are also contemplated.

Decryption module 314 produces one codebook for every state vector that is provided to it from state vector generator 316. Vocoder frames stored in queue 312 are provided to decryption module 314 in sequence, where a unique codebook derived from the current state vector is digitally combined with each vocoder frame to produce decrypted vocoder frames. Codebooks are combined with data frames using well-known techniques, such as adding one data frame to one codebook, using modulo-2 arithmetic. In another embodiment, 2 data frames are combined with a single codebook, the codebook in this embodiment having twice the number of data bits as a single vocoder frame.

After the decrypted vocoder frames are generated by decryption module 314, they are stored in queue 312, or in another memory device, until needed by vocoder 318. Vocoder 318 requires a constant stream of vocoder frames in order to accurately reproduce the original data transmitted by transmitter 100. Vocoder 318 uses vocoder frames stored in queue 312 to generate a digitized replica of the original signal transmitted from transmitter 100. Vocoder 318 generally requires a constant stream of vocoder frames from queue 312 in order to faithfully reproduce the original audio information. Vocoder 318 provides a digitized output signal to digital-to-analog converter D/A 320. D/A 320 converts the digitized signal from vocoder 318 into an analog signal. The analog signal is then sent to output transducer 322 where the analog signal is converted into an acoustic signal suitable for a listener to hear. Of course, output transducer 322 could alternatively comprise a video monitor suitable for viewing still images or video, or any other device suitable to the application at hand.

The coordination of the above processes is generally handled by processor 324. Processor 324 can be implemented in one of many ways which are well known in the art, including a discreet processor or a processor integrated into a custom ASIC. Alternatively, each of the above block elements could have an individual processor to achieve the particular functions of each block, wherein processor 324 would be generally used to coordinate the activities between the blocks.

As mentioned previously, vocoder 318 generally requires a constant stream of vocoder frames in order to reconstruct the original audio information without distortion. To achieve a constant stream of vocoder frames, queue 312 is used. Vocoder frames generated by formatting processor 308 are generally not produced at a constant rate, due to the quality of the communication channel and the fact that a variable-rate vocoder is often used in transmitter 100, generating vocoder frames at varying encoding rates. Queue 312 allows for changes in the vocoder frame generation rate by formatting processor 308 while ensuring a constant stream of vocoder frames to vocoder 318. One potential problem with the use of queue 312 is that it may cause a delay, or latency, during the transmission of audio information between transmitter 100 and receiver 300, for example, in a telephonic conversation.

One objective of queue 312 is to maintain enough vocoder frames to supply vocoder 318 with vocoder frames during periods of low frame generation by formatting processor 308 (thereby preventing an underflow of queue 312), but not too many frames due to the increased latency produced in such a situation.

In an underflow condition, processor 324 instructs vocoder 318 to use one or more "erasure" frames, rather than actual vocoder frames. An erasure frame is well known in the art that describes a frame which contains no data, but allows vocoder 318 to continue processing subsequent information without disruption. In an underflow condition, one erasure frame is used by vocoder 318 each time period that a vocoder frame is not available for use in queue 312, in the exemplary embodiment, every 20 milliseconds.

On the other hand, when the number of vocoder frames stored in queue 312 becomes relatively large, latency becomes a problem. Latency is defined as a time delay between when information is entered into a transmitter and when the information is available for use at a receiver. At receiver 300, as the number of vocoder frames stored in queue 312 increases, voice latency increases in proportion to the number of frames stored in queue 312. For example, if the number of frames stored in queue 312 is equal to 50, latency will be equal to 50 times 20 milliseconds (the length of each frame in the exemplary embodiment), or 1 second, which is unacceptable for most audio communications.

To combat the problem of latency, vocoder frames are removed from queue 312, or dropped, in order to reduce the number of vocoder frames that are ultimately processed by vocoder 318. By dropping vocoder frames at queue 312, the problem of latency is reduced. However, frames must be dropped such that a minimum amount of distortion is introducing into the audio information.

Frames may be dropped in accordance with one of a number of methods known in the art. For example, frames may be dropped at a single, fixed rate, at two or more fixed rates, at a variable rate, or a combination of any of these methods. In addition, if a variable-rate vocoder 104 is used at transmitter 100, frames may be dropped on the basis of the rate at which the frames were encoded by vocoder 104.

Generally, the decision of when to drop frames is based on the communication channel latency as determined by the communication channel quality, which in turn can be derived from the size of queue 312. As the size of queue 312 increases beyond a predetermined threshold, latency increases to an undesired level. Therefore, as the size of queue 312 exceeds a predetermined threshold, processor 324 begins to drop frames from queue 312 using one of the methods described above. As the size of queue 312 decreases past the predetermined threshold, frame dropping is halted by processor 324. For example, if the size of queue 312 decreases to 2 frames, latency is no longer a problem, and processor 324 halts the process of frame dropping.

If two or more fixed rate schemes are used to drop frames, two or more predetermined thresholds are used to determine when to use each fixed dropping rate. For example, if the size of queue 312 increases greater than a first predetermined threshold, processor 324 begins dropping frames at a first predetermined rate, such as 1 percent. If the size of queue 312 continues to grow, processor 324 begins dropping frames at a second predetermined rate if the size of queue 312 increases past a second predetermined size. As the size of queue 312 decreases below the second threshold, processor 324 halts dropping frames at the second predetermined rate and begins dropping frames more slowly at the first predetermined rate. As the size of queue 312 decreases further, past the second predetermined threshold, or size, processor 324 halts frame dropping altogether so that the size of queue 312 can increase to an appropriate level.

If a variable frame dropping scheme is used, processor 324 determines the size of queue 312 on a continuous or near-continuous basis, and adjusts the rate of frame dropping accordingly. As the size of queue 312 increases, the rate at which frames are dropping increases as well. As the size of queue 312 decreases, the rate at which frames are dropped decreases. Again, if the size of queue 312 falls below a predetermined threshold, processor 324 halts the frame dropping process completely.

Frames may also be dropped in accordance with the number of frames stored in queue 312 and the rate at which frames have been encoded by vocoder 104, if vocoder 104 is a variable-rate vocoder. If the size of queue 312 exceeds a first predetermined threshold, or size, vocoder frames having an encoding rate at a lowest encoded rate are dropped. If the size of queue 312 exceeds a second predetermined threshold, vocoder frames having an encoding rate at a second-lowest encoding rate and the lowest encoding rate are dropped. Conceivably, frames encoded at a third-lowest encoding rate plus second lowest and lowest encoding rate frames could be dropped if the number of frames stored in queue 312 surpassed a third predetermined threshold. Again, as the number of frames stored in queue 312 decreases through the predetermined thresholds, processor 324 drops frames in accordance with the encoded rate as each threshold is passed.

As explained above, frame dropping can occur at receiver 300 or at transmitter 100. However, in another embodiment, frame dropping can occur at both transmitter 100 and at receiver 300. Any combination of these frame dropping techniques discussed above can be used in such case.

At receiver 300, during periods of underflow or frame dropping, the crypto-syncronization between transmitter 100 and receiver 300 can be disrupted. The disruption is caused by vocoder frames being encrypted with a codebook derived from a first state vector being decrypted by a codebook derived from a second state vector. This results in vocoder frames being decrypted in error.

The present invention disables the state vector from incrementing during an underflow condition and advancing the state vector during a frame dropping situation. In an underflow situation, processor 324 disables state vector generator 316 from incrementing as erasure frames are provided to vocoder 318. State vector generator 316 is enabled when a frame again becomes available for decryption in queue 312.

Figure 4A:
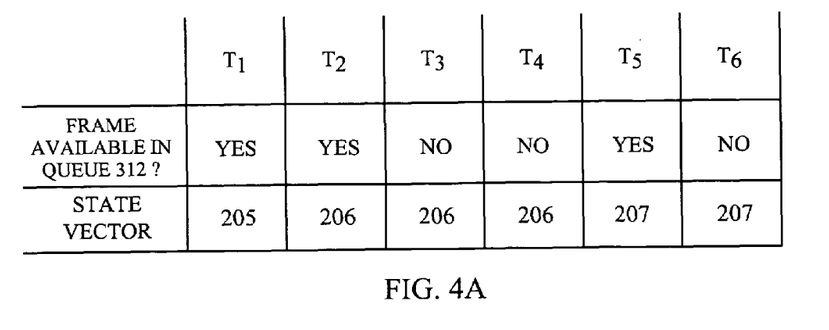
FIGS. 4a, 4b, and 4c illustrate the relationship between vocoder frames and a state vector as used in the receiver of FIG. 3.

FIG. 4a illustrates this point. As shown in FIG. 4a, the passing of time is denoted as time periods T1, T2, T3, and so on, T1 occurring first in time. Each time period is equal to the rate at which vocoder frames are generated at vocoder 104 in transmitter 104, in the exemplary embodiment, 20 milliseconds. At T1, a frame is available in queue 312 for decryption by decryption module 314. The state vector from state vector generator 316 is equal to 205, and is applied to the frame in queue 312 to decrypt it. At T2, the state vector is incremented. Another frame happens to be available for decryption in queue 312, so the state vector of 206 is applied to the frame in order to decrypt it. At T3, no frame is available for decryption in queue 312. Therefore, processor 324 disables state vector generator 316 from incrementing, resulting in the state vector generator remaining at a value of 206. At T4, again, no frame is available in queue 312 for decryption, so state vector generator 316 remains disabled from incrementing the state vector. At T5, a frame becomes available in queue 312, so state vector generator 316 is enabled and allowed to increment to the next value, which is 207. The frame in queue 312 is then provided to decryption module 314 and is decrypted using a codebook derived from the state vector having a value of 207. At T6, no frame is available for decryption in queue 312, so processor 324 disables state vector generator 316 from incrementing, resulting in a state vector value of 207.

During a frame dropping situation, processor 324 drops frames from queue 312 prior to decryption by decryption module 314. For each frame that is dropped, processor 324 must advance the count of the state vector to compensate for the frame(s) that was dropped.

Figure 4B:
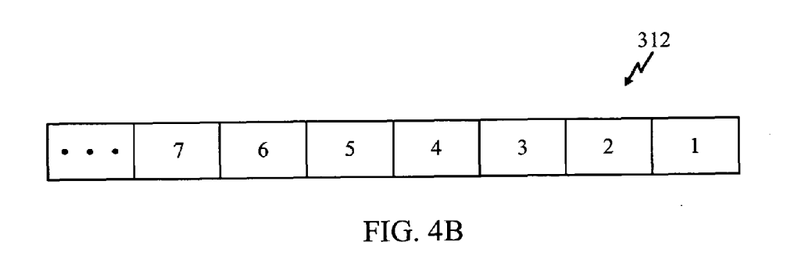
Figure 4C:
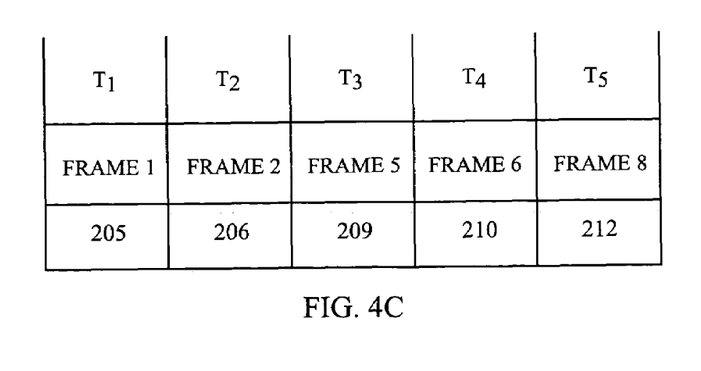

FIGS. 4b and 4c illustrate this point. As shown in FIG. 4b, vocoder frames are stored in queue 312 as they become available from formatting processor 308, beginning with frame 1 and continuing to frame 7 and beyond. Frames are provided to decryption module 314 at a predefined rate defined by the rate at which vocoder frames are generated by vocoder 104. FIG. 4c illustrates how state vector generator 316 is affected during frame dropping. At time T1, state vector generator provides a state vector having a value of 205 to decryption module 314, where a codebook is generated to decrypt frame 1. At time T2, the state vector is incremented to 206, where it is provided to decryption module 314 for use in generating a codebook to decrypt frame 2. At time T3, processor 324 drops frame 3 and frame 4. In an alternative embodiment, processor 324 chooses in advance which frame(s) stored in queue 312 will be dropped. In either case, at time T3, processor 324 provides the next non-dropped frame to decryption module 314, which, in this case, is frame 5. Processor 324 also directs state vector generator 316 to generate a state vector based on the number of frames that were dropped. In this case, 2 frames were dropped, therefore processor 324 directs state vector generator 316 to generate a state vector equal to 209, which is equal to the value that the state vector would normally be at (207), plus 2 to compensate for the 2 dropped frames.

At time T4, frame 6 is available for decryption, so it is provided to decryption module 314 while the state vector is incremented by 1, in this case, to a value of 210. At time T5, frame 7 is dropped by processor 324 and frame 8 is available for decryption. Therefore, at time T5, processor 324 directs state vector generator to increment the state vector by 2 to 212 (1 for a normal increment and 1 to compensate for the 1 frame that was dropped), and provides frame 8 to decryption module 314.

In either the underflow case or the frame dropping case, processor 324 directs state vector generator 316 adjust the state vector so that it remains synchronized to the state vector which encrypted the frame.

Figure 5:
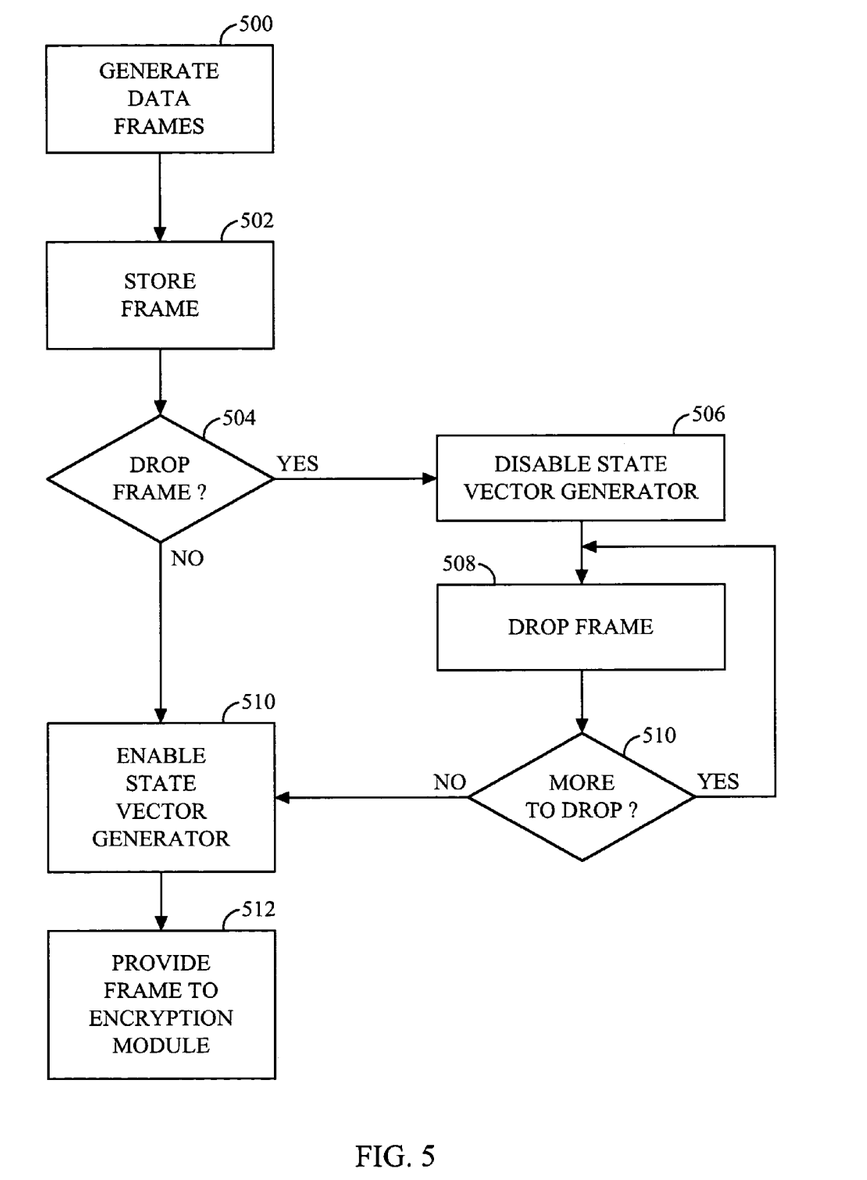
FIG. 5 is a flow diagram illustrating the method of the present invention as used at the transmitter of FIG. 1.

FIG. 5 is a flow diagram illustrating the method of the present invention as used in transmitter 100. In step 500, data frames are generated, generally at a constant rate, from vocoder 104. In an alternative embodiment, data frames are not generated from vocoder 104, but from any other data-producing device such as a video camera, a computer, or a digital camera. In the exemplary embodiment, frames are generated at a rate of one frame every 20 milliseconds.

In step 502, frames from vocoder 104 are stored in memory 106 for temporary storage. In the exemplary embodiment, only 1 frame may be stored at any one time in memory 106. However, in other embodiments, an alternative number of frames could be stored in memory 106. In yet another embodiment, frames are provided directly from vocoder 104 to encryption module 108 without the need for memory 106.

In step 504, processor 120 decides whether or not to drop a frame, based on one or more criteria such as transmission latency. If processor 120 determines that a frame should be dropped, processor 120 disables state vector generator 110 in step 506, thereby preventing the state vector from being incremented. In step 508, processor 120 drops the frame currently ready to be processed by encryption module 108. In the exemplary embodiment, processor 120 does not provide the current vocoder frame stored in memory 106 to encryption module 108.

In step 510, processor 120 determines if the next frame in sequence should be dropped. If so, processing continues back to step 508, where the next frame stored in memory 106 is dropped, and state vector generator 110 continues to be disabled. If the next frame is not to be dropped, processing continues to step 510.

Referring back to step 504, if processor 120 determines that the current frame is not to be dropped, processing continues to step 510, where state vector generator 110 is enabled (if it had been disabled in a previous step), thereby incrementing the state vector.

In step 512, the current frame that is stored in memory 106 is provided to encryption module 108 and is encrypted using a codebook derived from the current value of the state vector. The result of this process is that frames are encrypted using consecutive state vectors, even though one or more frames are dropped by processor 120 prior to encryption.

Figure 6:
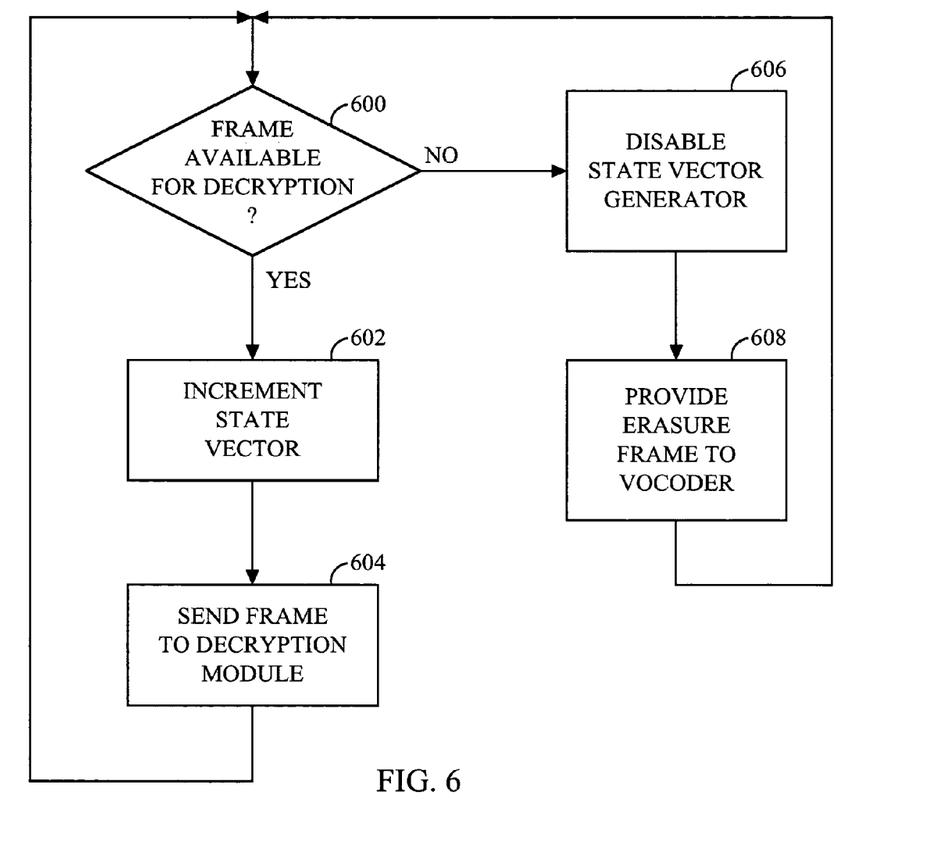
FIG. 6 is a flow diagram illustrating the method of the present invention as used at the receiver of FIG. 3 during an underflow condition.

FIG. 6 is a flow diagram illustrating the method of the present invention as used in receiver 300 during an underflow condition. In step 600, processor 324 determines whether or not any frames are available for decryption in queue 312. If at least one frame is available for decryption, the state vector is incremented in step 602. Next, in step 604, at least one frame is provided to decryption module 314, where it is decrypted using a codebook derived from the current value of the state vector from state vector generator 316. In order to be properly decrypted, the frame generally must be decrypted by a codebook derived from a state vector matching the same state vector used to encrypt the frame at transmitter 100. After the frame has been decrypted, processing then reverts back to step 600, where processor 324 determines if another frame is available for decryption.

If no frames are available for decryption in step 600, processing continues to step 606, where processor 324 disables state vector generator 316, freezing the value of the state vector to its present state. Next, processor 324 provides an erasure frame to vocoder 318 so that processing is uninterrupted. Processing then continues back to step 600, where processor 324 again determines if a frame is available for decryption. If no frame is available, processor 324 provides another erasure frame to vocoder 318. Step 606 is not repeated in this situation because state vector generator 316 has already been disabled previously.

The above process ensures that frames are decrypted properly even if they are provided to decryption module 314 at irregular intervals.

Figure 7:
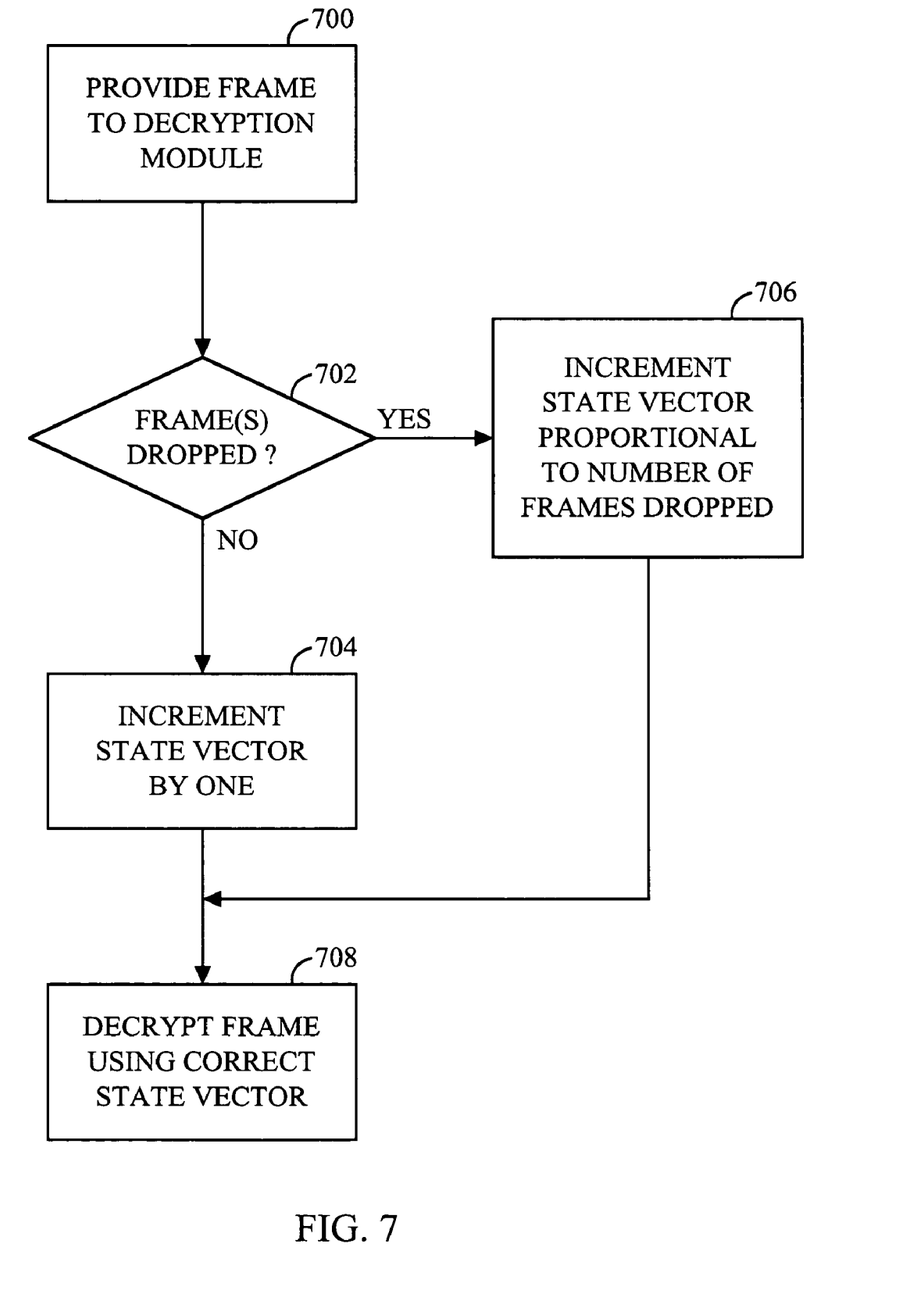
FIG. 7 is a flow diagram illustrating the method of the present invention as used at the receiver of FIG. 3 during a frame dropping condition.

FIG. 7 is a flow diagram detailing the method of the present invention as used in receiver 300 during a frame dropping condition. As mentioned previously, frame dropping occurs in receiver 300 when latency becomes excessive, often judged by the number of frames stored in queue 312 at any given time. The process begins in step 700, where a frame stored in queue 312 is provided to decryption module 314. In step 702, processor 324 determines the number of consecutive frames which have been dropped prior to the current frame. If no prior consecutive frames have been dropped, processing continues to step 704 where the state vector is incremented by a predetermined amount, in the exemplary embodiment, by one.

Referring back to step 702, if prior frames have been dropped, processing continues to step 706. Normally, frames are provided from queue 312 to decryption module 314 consecutively, as they are stored in queue 312. However, when processor 324 determines that one or more frames need to be dropped, the one or more frames that are dropped are not provided to decryption module 314. Rather, the next frame in queue 312 after the dropped frame(s) is (are) provided to decryption module 314. In step 706, processor 324 determines how many consecutive frames have been dropped prior to the current frame. The state vector is incremented a proportional amount in relation to the number of dropped frames. For example, if two frames have been dropped prior to the current frame, the state vector is incremented by three, one for normal incrementation and two to compensate for the two frames that were dropped. This process ensures that frames are decrypted properly even if one or more frames are dropped prior to decryption.

In step 708, the current frame is decrypted using a codebook derived from the current value of the state vector.

This process ensures that frames are decrypted properly even if one or more frames are dropped prior to decryption.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty.

Thus, the present invention is not intended to be limited to the embodiments shown herein but is to be accorded the widest scope consistent with the principles and novel features disclosed herein.

The invention claimed is:

1. A method for achieving crypto-syncronization in a packet data communication system, the packet data communication system comprising a transmitter and a receiver, said transmitter and said receiver each having cryptographic security capabilities, comprising the steps of:
   generating data frames at a predetermined rate in a transmitter;
   incrementing a state vector at said predetermined rate;
   providing said state vector to an encryption module;
   generating a codebook from said encryption module, using at least said state vector, said codebook for encrypting at least one of said data frames; and
   disabling said state vector when one or more of said data frames are dropped.

2. The method of claim 1 wherein said state vector is enabled after a desired number of said data frames have been dropped.

3. The method of claim 1 wherein the step of generating said data frames comprises the steps of:
   converting information into a digital format;
   providing said digitized information to a vocoder; and
   generating said data frames by said vocoder at said first rate.

4. The method of claim 1 wherein the step of dropping one or more of said data frames comprises the step of dropping said data frames at a fixed, predetermined rate.

5. The method of claim 1 wherein the step of dropping one or more of said data frames comprises the steps of:
   determining a communication channel latency; and
   dropping said data frames at a variable rate in accordance with said communication channel latency.

6. The method of claim 1 wherein the step of dropping one or more of said data frames comprises the steps of;
   determining a communication channel latency; and
   dropping each of said data frames having an encoded rate equal to a first encoding rate if said communication channel latency exceeds a predetermined threshold.

7. The method of claim 6, further comprising the step of dropping each of said data frames having an encoded rate equal to said first encoding rate and a second encoding rate if said communication channel latency exceeds a second predetermined threshold.

8. A method for achieving crypto-syncronization in a packet data communication system, the packet data communication system comprising a transmitter and a receiver, said transmitter and said receiver each having cryptographic security capabilities, comprising the steps of:
   generating data frames at a receiver;
   storing said data frames in sequence in a queue;
   providing said stored data frames, in sequence, to a decryption module;
   dropping one or more of said data frames in said queue;
   incrementing a state vector at a predetermined rate;
   providing said state vector to a decryption module;
   generating a codebook from said decryption module, using at least said state vector, said codebook for decrypting at least one of said data frames; and
   adjusting said state vector for each of said one or more data frames that are dropped.

9. The method of claim 8 wherein the step of adjusting said state vector comprises the steps of:
   determining a number of dropped data frames; and
   advancing said state vector in proportion to said number of dropped frames.

10. The method of claim 8 further comprising the steps of:
    applying said adjusted state vector to said decryption module;
    generating a second codebook derived from said adjusted state vector;
    providing a sequential non-dropped frame in said queue to said decryption module; and
    decrypting said sequential non-dropped frame using said second codebook.

11. The method of claim 8 wherein the step of dropping one or more of said data frames comprises the step of dropping said one or more data frames at a fixed rate.

12. The method of claim 8 wherein the step of dropping one or more of said data frames comprises the steps of:
    determining a communication channel latency; and
    dropping said one or more data frames at a variable rate in accordance with said communication channel latency.

13. The method of claim 8 wherein the step of dropping one or more of said data frames comprises the steps of;
    determining a communication channel latency; and
    dropping each of said data frames having an encoded rate equal to a first encoding rate if said communication channel latency exceeds a predetermined threshold.

14. A method for achieving crypto-syncronization in a packet data communication system, the packet data communication system comprising a transmitter and a receiver, said transmitter and said receiver each having cryptographic security capabilities, comprising the steps of:
    generating data frames at a receiver;
    storing said data frames in a queue;
    providing at least one of said data frames from said queue to a decryption module if available in said queue;
    providing a state vector to said decryption module, said state vector incremented at a predetermined rate;
    generating a codebook from said decryption module, using at least said state vector, said codebook for decrypting at least one of said data frames; and
    disabling said state vector when said queue is in an underflow condition.

15. A transmitter for achieving crypto-syncronization in a packet data communication system, the packet data communication system comprising said transmitter and a receiver, said transmitter and said receiver each having cryptographic security capabilities, said transmitter comprising:
    means for generating data frames at a predetermined rate;
    means for generating a state vector, said state vector incremented at said predetermined rate;
    an encryption module for generating a codebook from at least said state vector, said codebook for encrypting at least one of said data frames; and
    a processor for dropping one or more of said data frames and for disabling said state vector for each of said data frames that are dropped.

16. The apparatus of claim 15 wherein said data frames are dropped at a fixed, predetermined rate.

17. The apparatus of claim 15 wherein said data frames are dropped at a variable rate.

18. The apparatus of claim 15, wherein said processor is further for determining a communication channel latency, for dropping said data frames at a first fixed rate if said communication channel latency falls below a predetermined threshold, and for dropping said data frames at a second fixed rate if said communication channel latency exceeds said predetermined threshold.

19. The apparatus of claim 15 wherein said processor is further for determining a communication channel latency, and for dropping each of said data frames having an encoded rate equal to a first encoding rate if said communication channel latency exceeds a predetermined threshold.

20. The apparatus of claim 15 wherein said means for generating data frames comprises:
 a receiver for receiving a wireless communication signal; and
 a demodulator for demodulating said wireless communication signal and for producing said data frames.

21. A receiver for achieving crypto-syncronization in a packet data communication system, the packet data communication system comprising a transmitter and said receiver, said transmitter and said receiver each having cryptographic security capabilities, said receiver comprising:
 means for generating data frames;
 a queue for storing said data frames;
 means for generating a state vector, said state vector incremented at a predetermined rate;
 a decryption module for generating a codebook from at least said state vector, said codebook for decrypting at least one of said data frames; and
 a processor for dropping one or more of said data frames in said queue and for adjusting said state vector for each of said data frames that are dropped.

22. The receiver of claim 21 wherein said processor adjusts said state vector by determining a number of dropped data frames and advancing said state vector in proportion to said number of dropped frames.

23. The receiver of claim 21 wherein said processor drops said one or more data frames at a fixed rate.

24. The receiver of claim 21 wherein said processor is further for determining a communication channel latency and dropping said one or more data frames at a variable rate in accordance with said communication channel latency.

25. The receiver of claim 21 wherein said processor is further for determining a communication channel latency; and
 dropping each of said one or more data frames having an encoded rate equal to a first encoding rate if said communication channel latency exceeds a predetermined threshold.

26. A receiver for achieving crypto-syncronization in a packet data communication system, the packet data communication system comprising a transmitter and said receiver, said transmitter and said receiver each having cryptographic security capabilities, said receiver comprising:
 means for generating data frames;
 a queue for storing said data frames;
 means for generating a state vector, said state vector incremented at a predetermined rate;
 a decryption module for generating a codebook from at least said state vector, said codebook for decrypting at least one of said data frames; and
 a processor for disabling said state vector if no data frames are available to be decrypted in said queue.

27. The receiver of claim 26 wherein said state vector is enabled when at least one data frame becomes available for encryption in said queue.

* * * * *